United States Patent [19]

Myneni

[11] Patent Number: 5,018,387

[45] Date of Patent: May 28, 1991

[54] CRYOGENIC LIQUID LEVEL MEASURING APPARATUS

[75] Inventor: Ganapati R. Myneni, Grafton, Va.

[73] Assignee: Southeastern Universities Research Association, Newport News, Va.

[21] Appl. No.: 385,372

[22] Filed: Jul. 27, 1989

[51] Int. Cl.⁵ .............................................. G01F 23/00
[52] U.S. Cl. ....................................... 73/295; 73/301; 73/299
[58] Field of Search .................. 73/301, 295, 296, 299

[56] References Cited

U.S. PATENT DOCUMENTS

| | | | |
|---|---|---|---|
| 3,421,538 | 1/1969 | Hembree | 73/299 |
| 3,918,018 | 11/1975 | Tuley et al. | 73/295 |
| 4,368,639 | 1/1983 | Owens | 73/301 |
| 4,788,648 | 11/1988 | Ferretti et al. | 73/291 |
| 4,843,883 | 7/1989 | Glover et al. | 73/301 |

FOREIGN PATENT DOCUMENTS

| | | | |
|---|---|---|---|
| 0247971 | 7/1987 | Fed. Rep. of Germany | 73/299 |
| 0317726 | 12/1988 | Japan | 73/299 |
| 8703679 | 6/1987 | World Int. Prop. O. | 73/299 |

*Primary Examiner*—William A. Cuchlinski, Jr.
*Assistant Examiner*—Alvin Wirthlin
*Attorney, Agent, or Firm*—Staas & Halsey

[57] ABSTRACT

An apparatus for measuring a level of a cryogenic fluid in a cryostat includes a semiconductor pressure sensor mounted at the end of an elongated vertically disposed tube. The semiconductor pressure sensor is located at the bottom of the tube and is sealed in the bottom of the tube by a polymeric insulating material. The upper end of the tube is provided with a vent hole which communicates vapor pressure within the cryostat to the interior of the tube. The pressure sensor outputs an electrical signal in accordance with the differential pressure exerted on a semiconductor element of the pressure sensor from opposite sides by the vapor pressure within the tube and the fluid pressure outside the tube.

8 Claims, 5 Drawing Sheets

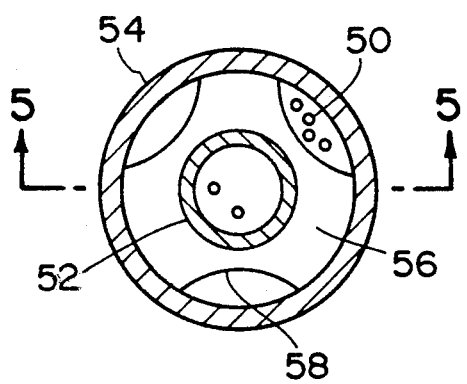
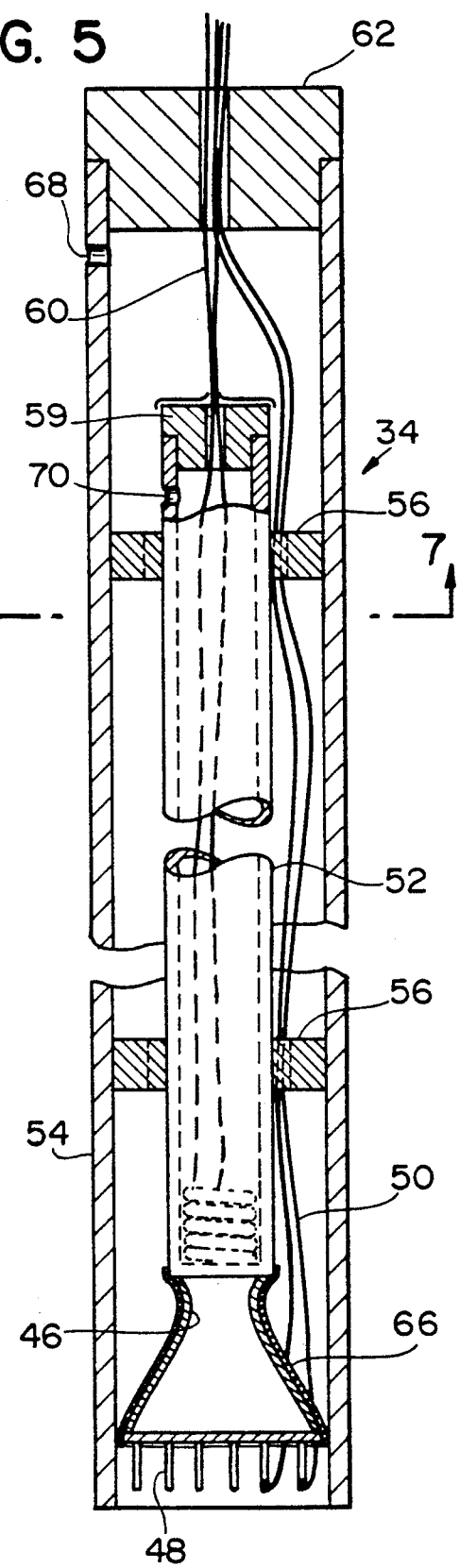
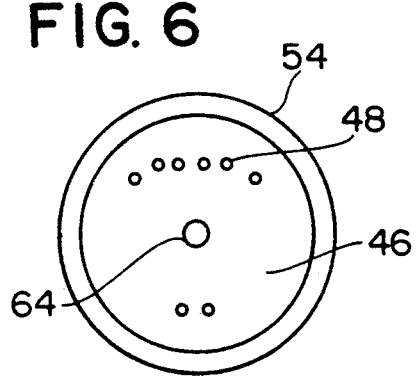

CRYOGENIC LIQUID LEVEL MEASURING APPARATUS

BACKGROUND OF THE INVENTION

1. Field of the Invention:

The present invention relates generally to the field of measuring and testing and, more specifically, to a cryogenic liquid level measuring apparatus.

2. Background of the Related Art:

Cryogenic liquids are liquified gases such as helium, hydrogen, nitrogen, oxygen, and liquid material gas, which are cooled to temperatures below 120K. These gases have industrial importance and will become more important as alternative fuels for vehicles, since some of these must be kept at cryogenic temperatures so that they do not occupy as much volume as the gases.

Liquid helium is currently being used to keep superconductors cool and thus, as the critical temperature of superconductor materials continue to increase, and thus as the superconductors become more and more practical, there will be an increasing demand for cryogenic liquids. Superconductors are used in making magnets for bending electron beams, for example, in continuous electron beams for probing the atom, and also for superconducting cavities.

At present, techniques used for measuring cryogenic liquid levels include the use of superconducting wires wherein part of the wire that is in the liquid has no resistance but the wire above the liquid does have a resistance and the level of liquid is determined by the amount of resistance in the total wire. The resistance is correlated to a level of liquid.

Another technique is to measure capacitance, between two concentric cylinders (tubes) the capacitance of the space between the concentric cylinders of the immersed part is different than the concentric cylinders in the gaseous part. This difference is used to determine the liquid level.

The normal operation of a superconducting wire liquid helium level sensor depends on the difference in heat transfer between liquid and vapor of helium. Reliable operation of the level sensor and a wide operating range (1.5 to 5K) relies on the critical heat flux of saturated pool boiling on the superconducting wire of the sensor. The critical heat flux of the level sensor is related to the operating temperature and current of the sensor.

FIGS. 1(a)-1(c) the voltage-current characteristic of the sensor at different temperatures. The hysteresis curve "C" is normal for a properly working sensor. The characteristic consist of non-linear (I), linear (II) and non-linear (III) segments. The first non-linear segment is related to the growth of the normal zone of the superconductor with increasing current towards the liquid-vapor interface. The linear segment is due to the linear dependence of the fixed normal zone above the liquid-vapor interface with increasing current. The second non-linear part is due to the driving down of the superconductor-normal interface inside the liquid because of the onset of film boiling. The current corresponding to the onset of the non-linear segment III can be termed as the critical heater current at which film boiling initiates.

FIG. 2 illustrates the critical heater current as a function of liquid helium bath pressure. For a comparison, FIG. 3 shows the critical heat flux versus pressure for horizontal wires. The qualitative agreement between the figures is evident. (FIG. 3 is taken from "Effects of Diameter and System Pressure on Critical Heat Flux for Horizontal Cylinders and Saturated Liquid Helium" published in *Cryogenics*, June 1989, Vol. 29).)

These level sensors are normally operated with 70 mA current and a line has been drawn to indicate this in FIG. 2, from which the following conclusions can be drawn. The sensor will not operate at temperatures above 4.6K, and the sensor will either indicate lower level or even hang up in the temperature range of 2.18K to 3.0K.

One could lower the sensor current to try to reliably operate the sensor in the above temperature ranges. However, this may reduce the sensor response time or even make it unstable depending upon the helium flow conditions.

Thus, a need exists for a new level sensor which is not subjected to the aforementioned drawbacks associated with known devices.

SUMMARY OF THE INVENTION

An object of the present invention is to provide a cryogenic liquid level measuring apparatus which does not rely on superconducting wires for determining a fluid level.

Another object of the present invention is to provide a cryogenic liquid level measuring apparatus which is effective in a wider range of temperatures and cryogens.

These and other objects of the invention are met by an apparatus for measuring a level of a cryogenic fluid in a cryostat having a bottom, the apparatus including a piezoresistive pressure sensor having an electrical output which varies in accordance with the level of the cryogenic fluid, a support for supporting the sensor near the bottom of the cryostat, and indicator means, coupled to the sensor for indicating the level of cryogenic fluid in the cryostat based on the electrical output of the sensor.

These objects, together with other objects and advantages which will be subsequently apparent reside in the details of construction and operation of the apparatus as more fully hereinafter described and claimed, reference being had to the accompanying drawings forming a part hereof, wherein like reference numerals refer to like parts throughout.

BRIEF DESCRIPTION OF THE DRAWINGS

FIG. 5 is an enlarged, cross-sectional view of the cryogenic liquid level measuring apparatus illustrated in FIG. 4;

FIG. 6 is a bottom view of the apparatus illustrated in FIG. 5;

FIG. 7 is a cross-sectional view taken along line 7—7 of FIG. 5; and

DETAILED DESCRIPTION OF THE PREFERRED EMBODIMENTS

Figure 1A:
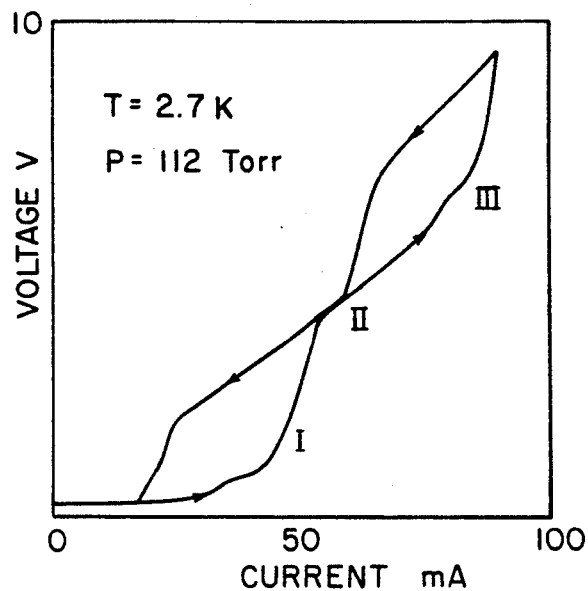
FIGS. 1(a)-1(c) is a graph showing voltage-current characteristics of a superconducting wire liquid helium level sensor.
Figure 1B:
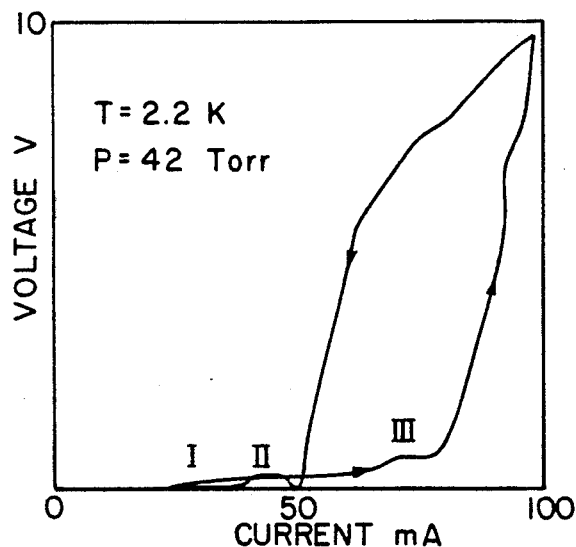
Figure 1C:
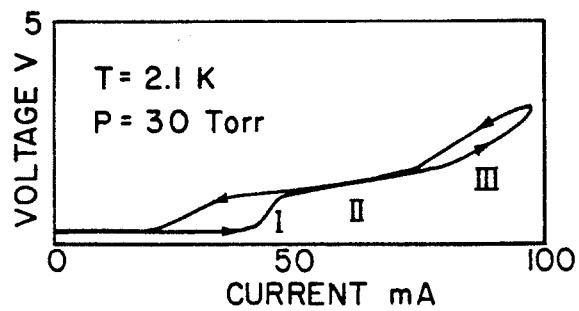
Figure 2:
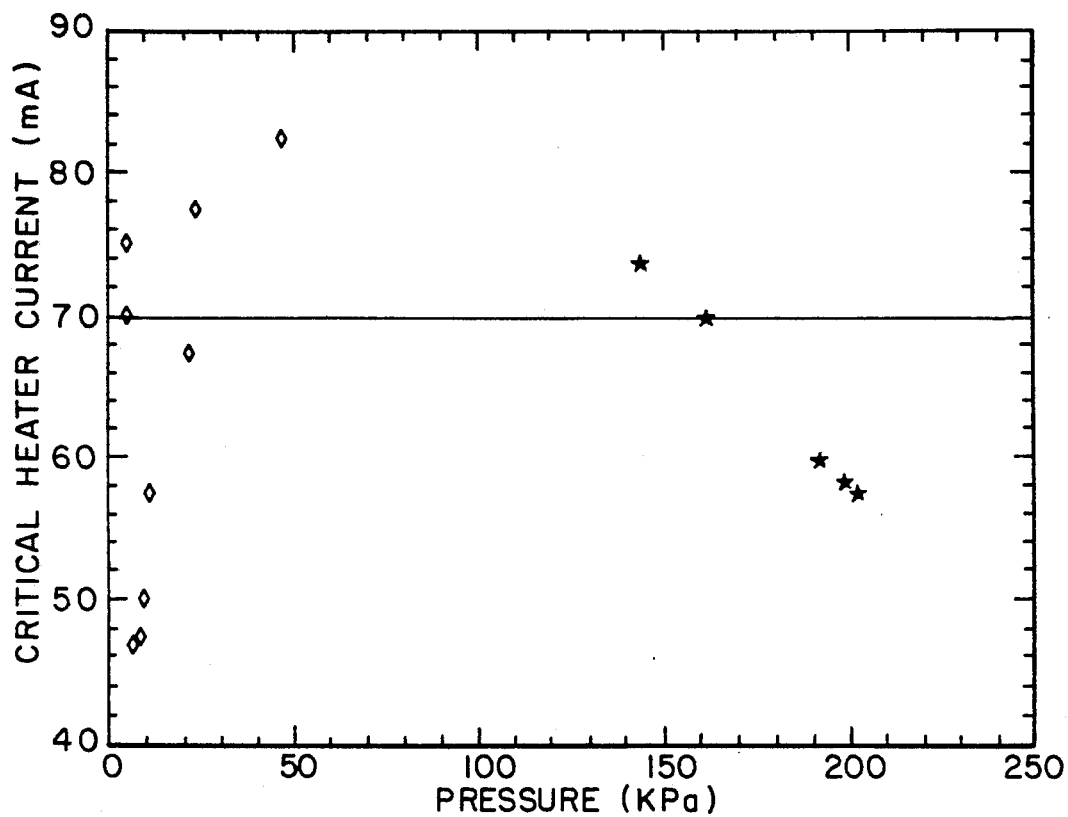
FIG. 2 is a graph showing critical heater current as a function of liquid helium bath pressure.
Figure 3:
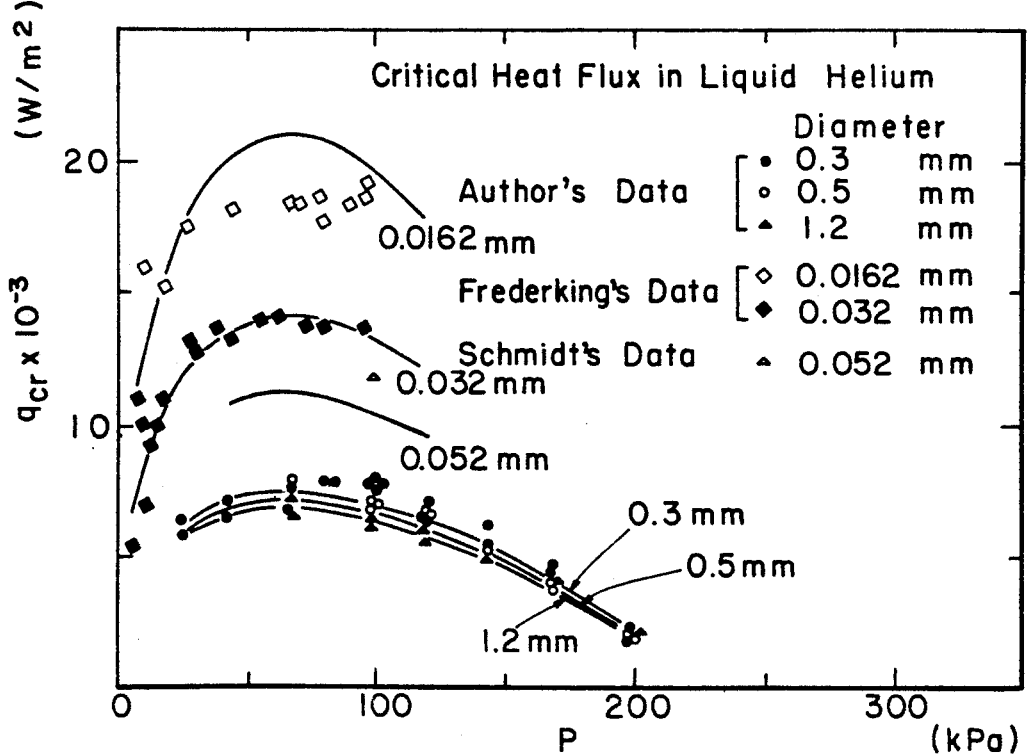
FIG. 3 is a graph illustrating critical heat flux versus pressure for horizontal wires.
Figure 4:
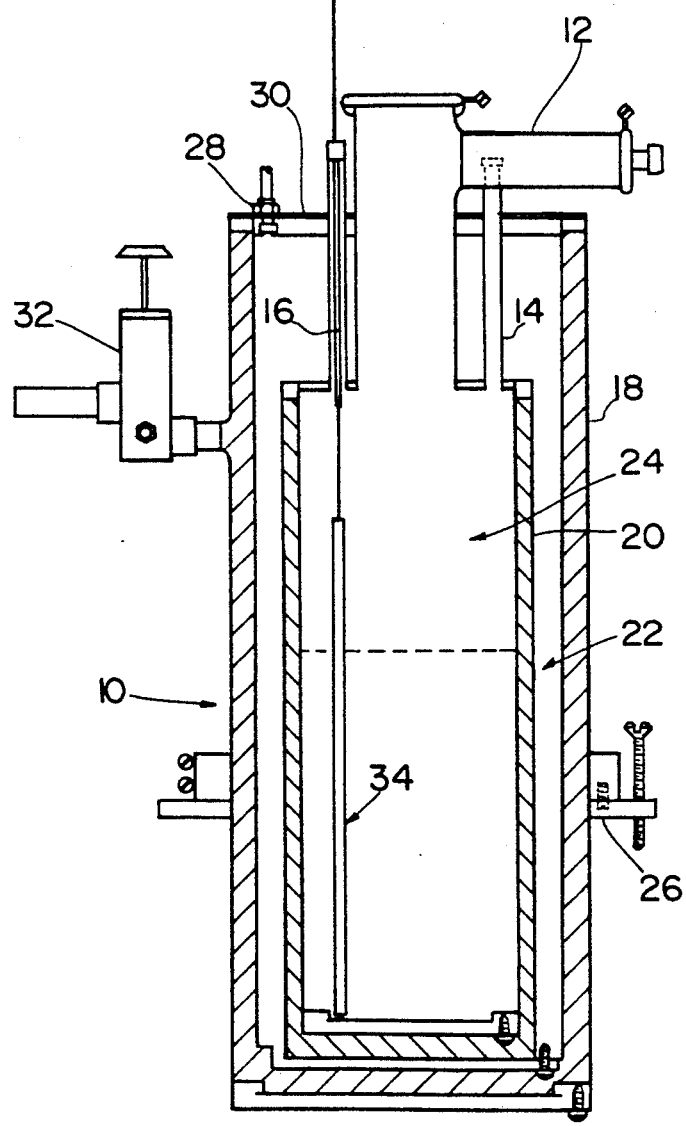
FIG. 4 is a schematic illustration of a liquid helium level sensor according to the present invention.

Referring now to FIG. 4, a cryostat is generally referred to by the numeral 10, and includes a helium reservoir pumping arm 12, two helium fill and vent ports 14 and 16, a first outer cylinder 18, and a second, inner cylinder 20. A nitrogen reservoir 22 is formed between the first and second cylinders, and a helium reservoir 24 is formed by the second cylinder 20. A mounting flange 26 is provided around the exterior cylindrical wall of the first cylinder 18. A nitrogen fill and vent port is formed in the nitrogen reservoir cover 30. An evacuation valve 32 is mounted on the first cylinder 18.

The cryostat 10 illustrated in FIG. 4 and described thus far is known in the industry. The present invention is illustrated generally in FIG. 4 as a cryogenic liquid level measuring device 34 which is mounted in the helium reservoir 24 and is electrically coupled to an instrumentation system 36 for first calibrating and then indicating the level of cryogenic fluid in the cryostat. Briefly, the instrumentation system 36 includes a power supply 38 (0–10 v), a current source 40, a digital voltmeter 42 and a computer 44.

Referring to FIG. 5, the measuring device 34 includes a piezoresistive pressure sensor 46 which has an electrical output which varies in accordance with level of the cryogenic fluid. The sensor itself is commercially available from Siemens Corporation and is known as a semiconductor pressure sensor. These are also known as "silicon pressure sensors". Pressure sensors of this type convert a physical quantity of pressure into an electrical signal. A measuring cell consists of a system chip with a thinly etched silicon diaphragm, in which resistance paths are formed by ion implantation. A carrier chip is also formed of silicon. The expansion of the diaphragm, due to an applied pressure leads to changes in resistance according to the piezoresistive effect. The thickness of the diaphragm, its surface area, and the geometric design of the resistors determine the permissible pressure range. Two such sensors are available from Siemens as model number KPY 31R and KPY 32R. Each has two supply voltage terminals and two output voltage terminals. These are illustrated as a plurality of leads 48 which are wired by wiring 50 to a corresponding display (not shown in FIG. 5).

The sensor 46 is mounted near the bottom of the tank or a cryostat by a mounting apparatus or a support which includes a first, inner tube 52, the lower end of which supports the sensor 46 by having a neck portion of the sensor housing fitted into the inner diameter of the tube 52 at its lower end.

A second, outer tube 54 is mounted coaxially with the first, inner tube 52 disposed therein. Preferably, the coaxial position of the inner tube is maintained by a plurality of spacers 56, each having an inner bore which fits tightly around the outer circumferential surface of the inner tube 52 to be fixedly connected thereto. Also, each spacer 56 includes peripheral, symmetrically spaced indentations 58 (FIG. 7) which permit the wires 50 to pass from the sensor 46 all the way through the length of the two tubes. Although the tubes are truncated for the purposes of illustration in FIG. 5, the overall length would be approximately 50 inches in one embodiment; however, the height or length of the tubes would depend on the dimensions of the cryostat in which the sensor would be used.

The inner tube 52 is provided with an end cap 59 which has an axial bore through which a heating wire 60 passes. Similarly, the outer tube 54 is provided with an end cap 62 having an axial bore through which the heating wires 60 and connecting wires 50 pass, to be coupled to power sources and display or indicator means.

Referring to FIG. 6, the sensor 46 includes a port 64 which is exposed to the fluid so as to enable a pressure reading from the sensor. The pressure is determined by the head of fluid in the cryostat, with increasing pressure occurring at higher heads. The sensor 46 is covered with a polymeric insulation 66, such as STYCAST 2850GT sold by Emerson & Cumings, or other suitable epoxy resins. The thin insulating layer coated on the pressure sensor allows the temperature of the sensor to be just above the cryogen temperature to avoid condensation.

The heater wire 60 extends the full length of the inner tube 52 and heats the interior of the tube to prevent condensation which arises because the liquid is very cold, and when new material is put in, the new liquid which may have a gas at a higher temperature which will condense on the probe and change its measurement. The wire is preferably a 36 SWG constant wire manufactured by Omega Engineering, Inc. of Stanford, Conn.

The heater wire raises the temperature sufficiently such that condensation does not occur. Typically, the heater wire will raise the temperature about 5° K. above the normal temperature of the liquid (i.e., the saturated temperature of the liquid). Since the sensors itself develops a slight amount of heat, the insulation layer is preferable to keep the sensor at a temperature above the cryogenic liquid temperature to minimize condensation in the sensor. The semiconductor of the sensor 46 is, as previously mentioned, known generally, and is constantly powered by constant current source. The measurable voltage varies as a function of the pressure exerted at the port 64, which correspondingly indicates the level of cryogenic fluid in a cryostat.

At the top of the outer tube 54 there are several small holes 68, which are about 1 millimeter in diameter, and there is at least one hole 70 at the top of the inner cylinder which is about 0.5 millimeter in diameter. These holes serve to permit the top of the column to detect the gaseous pressure at the top of the tank. Usually, there is no over pressure in the tank but sometimes there is pressure excursion; however, because the holes are small, they prevent such excursions of pressure, including those due to sloshing of the liquid.

Figure 8:
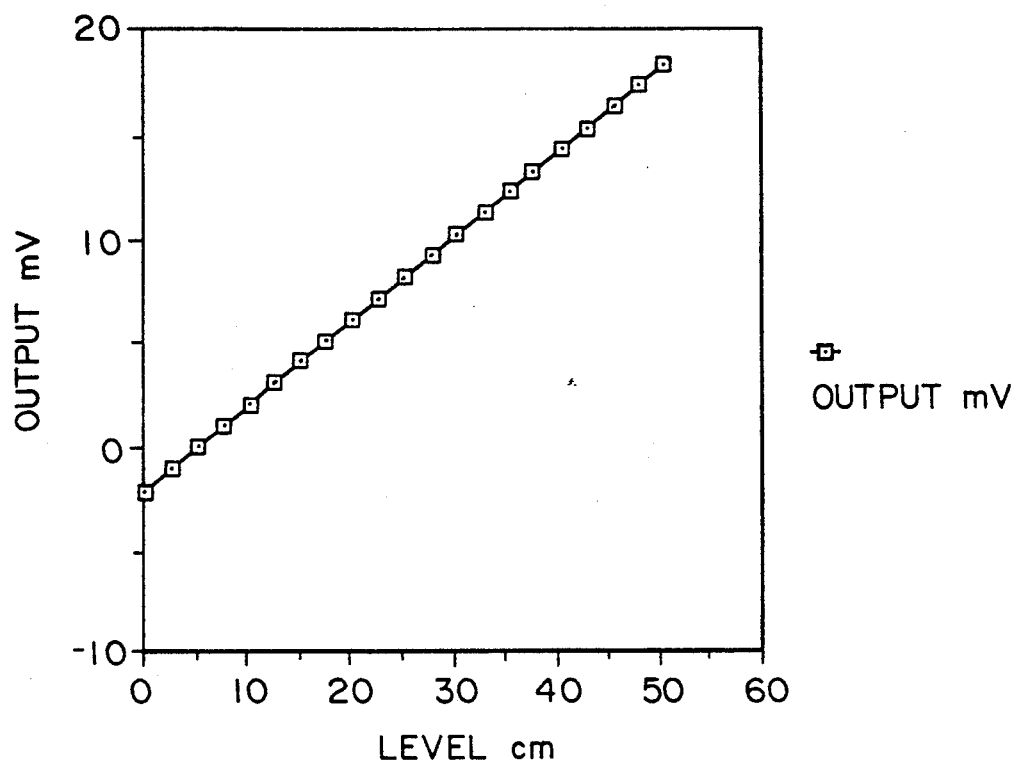
FIGS. 8 and 9 are graphs of electrical output to cryogen level using the present invention.
Figure 9:
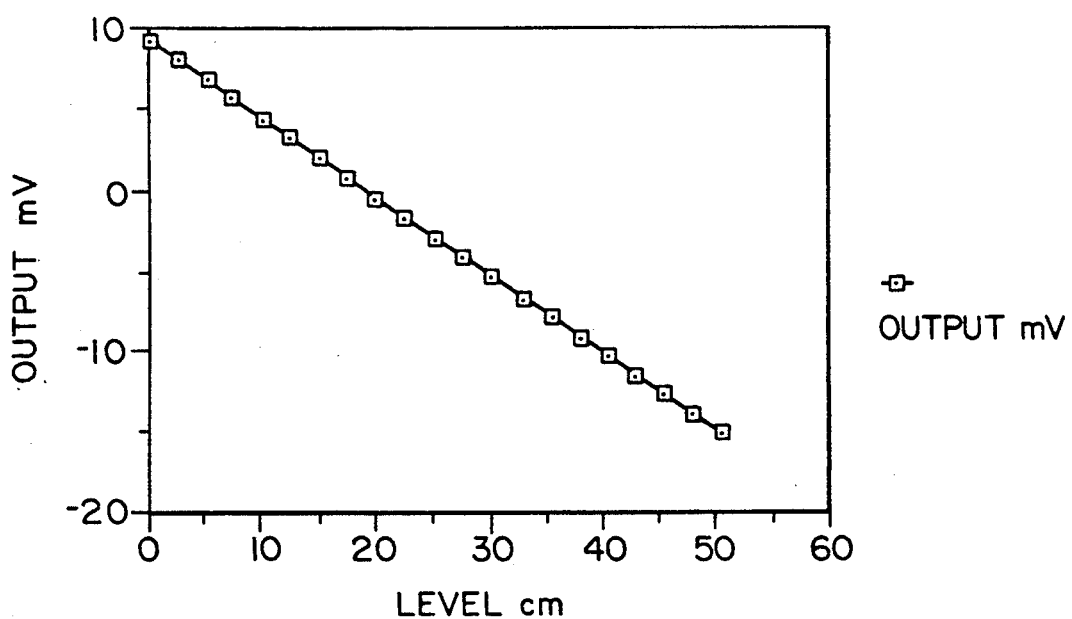

The pressure of the pressure sensor is measured by voltage and the voltage is thus an analog of the actual pressure. Referring to FIG. 8, the sensor has an output which correlates to a level within the container. The output is measured in millivolts and the level in the container is referred to in centimeters. A calibration technique is to first find a zero offset for the sensor, at the boiling point of the cryogenic liquid and then change the level to see how the output varies. Then, the measured results can be put into a computer or it can be charted to compare the output with what it has been calibrated to by the level. FIGS. 8 and 9 represent two different types of sensors which indicate that there is a generally linear relationship between output and level, although the line may be positively or negatively sloped, depending on the sensor.

The inner and outer tubes are made of fiberglass and impregnated with phenolic resin. Suitable tubing is commercially available from AIN Plastics, Inc. of Mount Vernon, N.Y. and is generically referred to as "phenolic tubing".

The pressure sensor includes a diaphragm which is made of a semiconductor material such as silicon which has four ion implanted resistors. Vapor pressure, or pressure from within the vessel above the liquid level is communicated to the interior of the inner tube 52 through the hole 70 and thus exerts a pressure forced against the upper side of the semiconductor. An opposing force is exerted on the opposite side of the semiconductor which results from the head of the fluid in the cryostat. The electrical output of the sensor 46 is thus based on differential pressure between the gaseous pressure in the vessel and the pressure attributed to the head of the liquid in the vessel.

The zero offset of the piezoresistive pressure sensor at an operating current of 1 mA and at 4.22K, the boiling point of liquid helium, is determined prior to its assembly into the level sensor apparatus. The level sensor is placed in a prior state such as what is shown in FIG. 4 and the cryostat is slowly filled with liquid helium. The change in output of the level sensor is recorded as the cryogen level in the cryostat increases. Typical sensitivities for the level sensors are plus or minus 40 $\mu$V and plus or minus $-20$ $\mu$V per millimeter of liquid helium for two different types of commercially available sensors, so by the designation KPY 31R and KPY 32R, respectively.

The power supply to the heater wire is connected while the cryogen is being filled and when the saturated bath temperature is below that of the cryogen that is being transferred. This sensor is suitable for all cryogenic liquids including liquid natural gas.

The semiconductor pressure sensor has a very low thermal inertia so it does not subtract or add heat of any significant qualities to the system.

The many features and advantages of the present invention are apparent from the detailed specification, and thus, it is intended by the appended claims to cover all such features and advantages of the cryogenic fluid measuring apparatus which fall within the true spirit and scope of the invention. Further, since numerous modifications and changes will readily occur to those skilled in the art based upon the disclosure herein, it is not desired to limit the invention to the exact construction and operation illustrated and described. Accordingly, all suitable modifications and equivalents may be resorted to falling within the scope and the spirit of the invention.

What is claimed is:

1. An apparatus for measuring a level of a cryogenic fluid in a cryostat having a bottom, comprising:
    a pressure sensor having an electrical output which varies in accordance with a head of the cryogenic fluid;
    a support for supporting the sensor near the bottom of the cryostat; and
    indicator means, coupled to the sensor, for indicating the level of cryogenic fluid in the cryostat based on the electrical output of the sensor,
    wherein the support means comprises a first inner tube, and
    a second outer tube mounted coaxially with the first inner tube, wherein the first inner tube has a lower end to which the sensor is mounted, and an upper end portion which has at least one hole formed radially therein, wherein the sensor is a semiconductor sensor having a housing, a semiconductor element having one side exposed to the interior of the first inner tube and an opposite side exposed to the cryogenic fluid, the electrical output corresponding to a differential pressure between the pressure within the inner tube and the pressure at the bottom of the cryostat attributable to the head of the cryogenic fluid.

2. An apparatus according to claim 1, further comprising a plurality of spacers for mounting the first, inner tube coaxially with the second, outer tube.

3. An apparatus according to claim 1, further comprising heater means disposed within the support for preventing condensation of gaseous cryogenic fluid in the support.

4. An apparatus according to claim 3, wherein the heater means is a resistive heat wire disposed within the support.

5. An apparatus according to claim 1, further comprising an insulating layer provided on an exterior surface of the sensor.

6. An apparatus according to claim 1, wherein the housing of the sensor is covered with a polymeric insulation.

7. An apparatus according to claim 6 wherein the hole provided in the upper portion of the innertube provides means for compensating for changes in pressure attributable to sloshing of cryogenic fluid.

8. An apparatus according to claim 1, wherein the indicator means is a volt meter.

* * * * *